W. GALE.
Straw Cutter.
No. 1,800.
Reissued Oct. 25, 1864.
Fig. 1
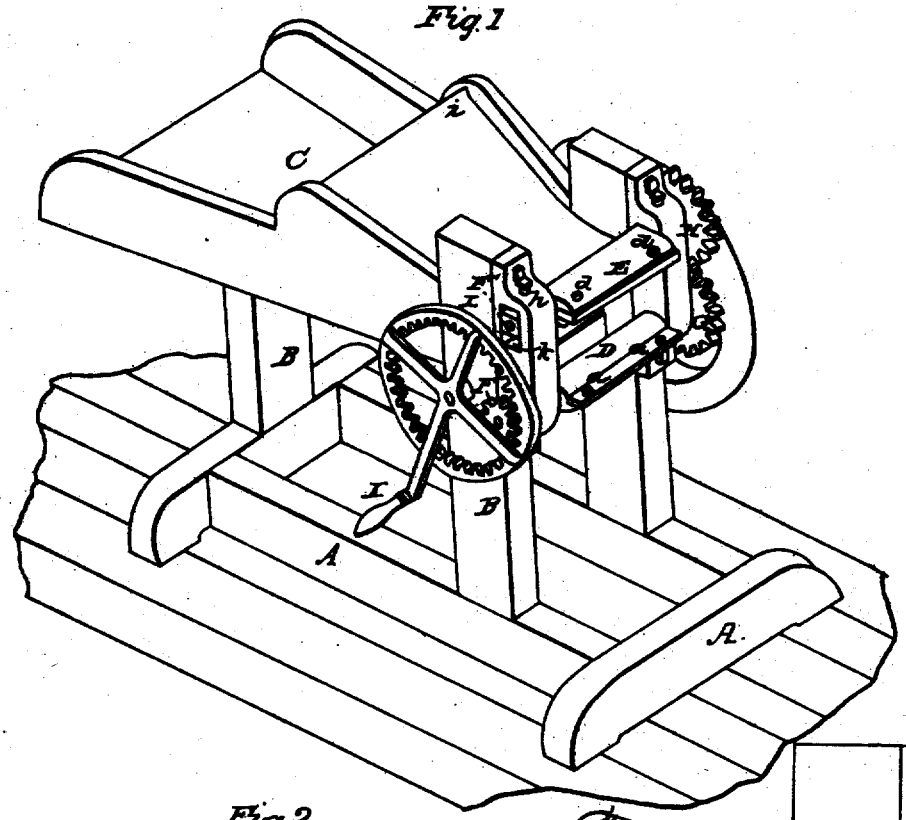
Fig. 2
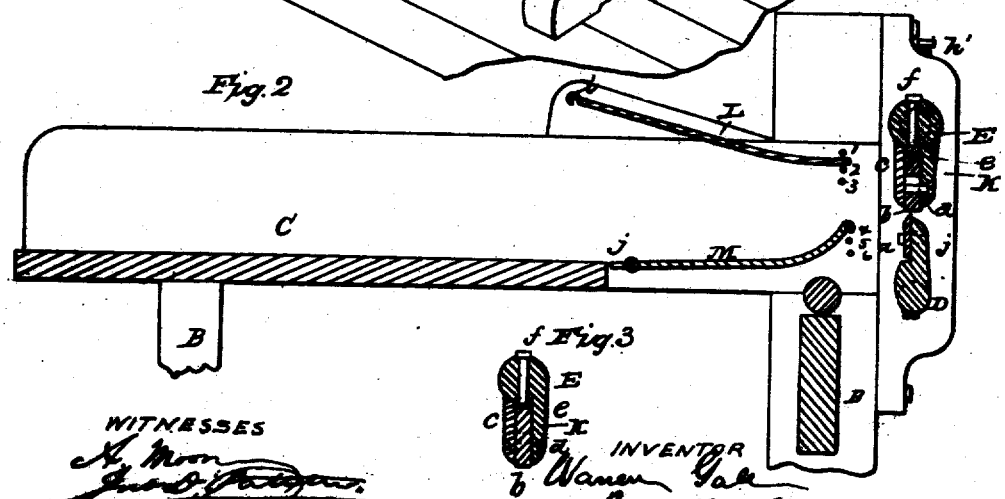
Fig. 3
WITNESSES
A. Moon
INVENTOR
Warren Gale
By B. & L. P. Coggeshall Attys.
N. PETERS, Photo-Lithographer, Washington, D. C.

UNITED STATES PATENT OFFICE.

WARREN GALE, OF CHICOPEE FALLS, MASSACHUSETTS.

IMPROVEMENT IN STRAW-CUTTERS.

Specification forming part of Letters Patent No. 11,667, dated September 12, 1854; Reissue No. 938, dated April 3, 1860; Reissue No. 1,800, dated October 25, 1864.

*To all whom it may concern:*

Be it known that I, WARREN GALE, of Chicopee Falls, in the county of Hampden and State of Massachusetts, have invented new and useful Improvements in Cutters for Hay, Straw, and other Substances; and I hereby declare that the following is a full, clear, and exact description thereof, reference being had to the drawings, which accompany and form a part of this specification.

Of the drawings, Figure 1 is a perspective view of a cutter constructed according to my invention. Fig. 2 is a vertical longitudinal section showing the adjustable mouth, the cutting and pressure cylinders, and the principal appendages of each of the said parts. Fig. 3 is a detail view, also representing a vertical section of the pressure cylinder.

My improvements pertain to those classes of cutters which are provided with two revolving cylinders, upon only one of which the knife or knives are secured and against the other of which these knives cut; and they consist, first, in connecting, by gearing or other equivalent means, the two cylinders in such manner that the knife, or each of the knives, upon one shall at every revolution be caused to come into actual contact with the other cylinder, or with some part of the other cylinder, at any desired point to which the parts may be adjusted; second, in constructing what I term the "pressure-cylinder"—that is, the cylinder against which the knife or knives cut—with radial flanges, arms, or projections for grasping and drawing forward the feed to be cut; third, in forming the pressure-cylinder at those parts against which the knife or knives are made to cut in sections or strips separate from the body of the cylinder, so that these sections or strips can be adjusted to compensate for wear, and can be removed for repair or renewal without disturbing the main portion of the cylinder; fourth, combining an adjustable throat for regulating the length of cut, for compressing the feed to be cut, and for other purposes, with a revolving cutting-cylinder, the knives of which act to draw forward the feed.

To enable others to put my improvements into use, I will explain one manner in which I have applied them in practice with success.

A represents the base of a straw-cutter, and B the uprights for supporting the feed-box C. D is what I term the "cutting-cylinder"—that is, the cylinder to which the knife or knives are attached—and E is the pressure-cylinder against which they cut. These cylinders revolve, respectively, upon shafts or journals F F′, mounted transversely between the uprights of the cutter, and they are connected and driven by the gears G and H, secured on their respective shafts or by other equivalent means. This mode of construction renders them capable of being so operated that at every revolution the knife or each of the knives on the cutting-cylinder shall come into actual contact with any point of the pressure-cylinder or of its flanges which they are adjusted to strike, and shall continue to cut at this point until a new adjustment is made. These gears may be put in motion by the crank I, acting through the master cog-wheel I′ and the pinion I″, the latter of which is fast on the journal F, or by any other mover acting in any convenient manner. The knives may be secured to the cutting-cylinder in any of the usual modes. I, however, prefer to fasten them by screwing them by the screws *a* to flanges J, cast or otherwise formed upon its perimeter.

Figs. 2 and 3 represent the construction of the pressure-cylinder, and it will be seen that, instead of being of full cylindrical shape it is made with radial flanges, arms, or projections K upon its exterior. When this cylinder is revolved, these flanges, by an operation which will be obvious, grasp the feed and draw it forward to the knives, and also aid in properly compressing it for the cut. It will be readily understood that in both of these respects my invention is vastly superior to the ordinary "full" cylinders, which are not provided with any projections by which they can seize or compress the feed. The flanges are of sufficient thickness for the knives to strike squarely against them, and they may or may not, as desired, be provided with a detachable strip, *b*, which I prefer to make of leather, rawhide, or other suitable soft substance to protect the edge of the knife. When such a strip of either of these materials is used, the mode I prefer for securing it and adjusting it in place is by putting it between the flange K and a plate, *c*, and binding the whole firmly together by a screw, *d*. There may be a second plate, *e*, over the upper end of the material so employed, and against this the set-screw *f*, which passes through the axis of the cylinder E, may bear. By means of this plate *e* and set-screw the strip of protecting material, by loosening the screw *d*, can be forced down as it wears away and be properly adjusted to the knife.

The journals of the pressure cylinder rest in oblong slots *h*, so that, by means of set-screws *h'*, it also may, if found expedient, be adjusted to the knife, and this I consider the best method to adopt when more than one knife is employed, as it enables me to dispense with the plate *e* and set-screw *f*.

That part of my invention which relates to the adjustable throat of the cutter I have constructed as follows: L is an upper, and M is a lower, throat-piece, so arranged as to incline toward each other as they approach the cylinders. The upper one, L, is hinged or otherwise hung at *i*, and near its other end holes 1 2 3 are pierced in the side of the cutter-box. By inserting a pin in either of these holes the forward end of the throat-piece L may be raised or lowered, as desired. The other piece, M, is hinged in a slot, *j*, so as to be movable toward or from the cylinders at one end and toward or from the piece L at the other end, this being effected by the holes 4, 5, and 6 and by a suitable pin fitted into them.

The upper throat-piece is so curved and hinged relatively to the flanges K that its forward end nearly meets the leather or other substance *b* at every revolution of the pressure-cylinder, whether it rests at hole 1, 2, or 3; and the lower throat-piece, M, by its double adjustability, can be made to almost meet the knives at every revolution of the cutting-cylinder, whether its forward end is at hole 4, 5, or 6.

When either of the throat-pieces is set at any desired one of the holes, only such a mass of feed as is due to the particular adjustment thus given to them can pass to the cylinders, and, as the latter, in revolving, will catch sooner and be longer in contact with a thick mass of feed than they will a thin one, they will draw forward the thick mass farther than they will the thin one, and hence the thicker the mass subjected to their action is the longer will be the cut made. Thus the distance which the feed to be cut is drawn forward by the cylinders always proportioned to the points at which the forward ends of the throat-pieces are adjusted, and therefore when the latter are expanded they permit a thicker body to pass, and when they are contracted they only afford room for a thinner one. In this way they regulate the length of the cut, and at the same time, they serve to guide the feed properly to the knives.

It will also be seen that while the throat-pieces are prevented from expanding beyond the particular point they are at all times left free to rest against the uncut feed, whether the cutter-box is full or only partially full, so it will constantly operate automatically to compress it for the next cut, and will prevent it from recoiling from the knives, and also from being by its clinging to the flanges or knives drawn forward after one cut has been made as when the feed is damp is apt to occur, thereby making the next cut a larger one, all of which results are very important.

Among the advantages of my improvements the following may be mentioned: By employing the gears or their equivalent to connect the cutting-cylinder with the pressure-cylinder all the corresponding points in the two cylinders may be caused to be always opposite to each other instead of constantly changing their relative position, as is the case when, as in ordinary cutters, the cylinders are revolved by the pressure of the edge of the knives of the cutting-cylinder when they are making their cut against the uncut feed or against the face of the pressure cylinder. Hence I completely avoid the scraping and slipping action of the knives which occurs in these other cutters, and which rapidly destroys the knife-edges, as well as the surface of the pressure-cylinder, and sometimes causes the latter to be so much worn over that it wears too greatly to be able to press against the knives closely enough to cut all the feed.

By my invention the pressure-cylinder is rendered almost indestructible, and the knives will retain their edges without sharpening for a very long time.

This portion of my improvements will be found equally applicable to those cutters wherein cylinders are employed which do not have my radial flanges, arms, or projections.

I would remark that I am aware of the patent of John Boyington of November 25, 1838, in which cylinders are represented as connected by gearing, but his cutter differs materially from mine in, among other things, that he is compelled to use a large number of knives, most of which I dispense with, for it is one characteristic of my invention that I make use of my gears to connect the cutting-cylinder which carries all the knives, with the pressure-cylinder, which carries no knives, and also in that his knives do not cut in contact with a pressure cylinder. By employing the radial flanges, arms, or projections a much thicker body of feed and much coarser materials—such as cane and cornstalks and other large substances—can be cut in my machine than is possible with the ordinary cutters. They also afford ample room for the uncut feed to expand into the space between them, and thereby facilitate the working of the cylinders. They likewise aid in enabling me to dispense with some of the knives heretofore used, and thus permit any dirt or gravel which may be mixed with the feed to very readily fall down and be expelled without clogging the cylinders or injuring the knives. I may here remark that in speaking of these radial flanges, arms, or projections I mean to exclude from this description those devices wherein there are knives on both cylinders cutting in between and not in contact with each other, for the operation of my invention is entirely different from that of these knives.

By making those parts of the pressure cylinder against which the knives cut in detachable sections or strips I obviate the necessity which has hitherto existed of removing the entire cylinder when this portion of it becomes worn out, and I am thus enabled to reduce the cost of such repairs from several dollars to a few cents. By my mode of constructing the adjustable throat so that it will always rest against and compress and hold in place the feed to be cut I dispense with many of the knives which have heretofore been employed.

In other cutters, to make a good machine, it has been needful to use knives enough to be placed sufficiently near together to enable one of them to come in contact with the feed which is to be cut, or with that which is being cut, and to hold it while the cut is being made by the preceding knife. This required the knives to be set so near to each other that only light feed in a thin layer can be cut with them; but with the compression exerted by my automatic throat the feed is retained firmly in place without requiring the action of the knives to hold it, and I can consequently reduce the number of the latter to three or four, or even, in some cases, to only one, which will be found best for cutting the feed very short, and this also has the effect of lessening the cost of the machine and of enabling thicker and stronger knives to be used.

My improvements are equally applicable to oblique, spiral, or straight knives.

I do not confine myself to the precise construction here shown for the adjustable throat or for the other parts of my cutter so long as the modes of operation above described are not departed from; but, Having thus explained one mode of putting my inventions in practice, what I claim as new is—

1. Connecting the cutting and the pressure cylinders of cutters for hay, straw, or other substances by gearing, or its equivalent, in such manner that the knife, or each of the knives upon one cylinder, shall at every revolution be caused to come into actual contact with the other cylinder, or with some part of the other cylinder, at any desired point to which the parts may be adjusted.

2. The employment, in a straw or other cutter, of a revolving cutting-cylinder having one or more knives, in combination with a pressure-cylinder having one or more radial flanges, arms, or projections, and so arranged that the feed is caught between the two, drawn forward, and cut off by the pressure between the knife on one cylinder and the flange on the other.

3. Forming those parts of the pressure-cylinder against which the knife or knives are made to cut in sections or strips separate from the body of the cylinder, substantially as and for the purpose set forth.

4. Combining with the feed-box of a straw or other cutter an adjustable throat, having a mode of operation substantially as set forth.

5. Combining substantially as set forth an automatically-operating throat with the cutting-cylinder of a straw or other cutter in such a manner as to diminish the number of knives heretofore employed in ordinary cutters.

WARREN GALE.

Witnesses:
S. D. COZZENS,
ANDREW J. TODD.